United States Patent [19]

Flitton

[11] Patent Number: 5,176,487
[45] Date of Patent: Jan. 5, 1993

[54] VEHICLE WHEEL CHANGING TOOL

[76] Inventor: Michael B. Flitton, 471 Beall La., Central Point, Oreg. 97502

[21] Appl. No.: 728,351

[22] Filed: Jul. 11, 1991

[51] Int. Cl.⁵ ............................................. B65B 29/00
[52] U.S. Cl. ................................. 414/428; 414/426; 414/433; 254/131; 254/133 R; 280/79.4
[58] Field of Search ............. 414/426, 427, 428, 429, 414/430, 433; 280/79.4, 47.131; 254/10 R, 131, 133 R

[56] References Cited

U.S. PATENT DOCUMENTS

| 1,920,350 | 8/1933 | Bourdon | 254/131 |
|---|---|---|---|
| 2,207,443 | 7/1940 | Schneider | 254/131 |
| 2,332,443 | 10/1943 | Foringer | 414/429 |
| 2,640,615 | 6/1953 | Wedel | 414/428 |
| 2,815,877 | 12/1957 | Marshall | 414/428 |
| 3,378,154 | 4/1968 | Mousel | 414/428 |
| 3,441,157 | 4/1969 | Kitsuda | 414/428 |
| 3,976,212 | 8/1976 | Sanchez | 414/428 |
| 4,771,531 | 9/1988 | Asher | 29/426.3 |
| 4,872,694 | 10/1989 | Griesinger | 414/428 X |

*Primary Examiner*—Frank E. Werner
*Attorney, Agent, or Firm*—James D. Givnan, Jr.

[57] ABSTRACT

The wheel changing apparatus includes a pair of angular arms supported at their outer ends by caster wheels or skids with the arms joined at their remaining ends by a connector housing. A handle on the housing facilitates raising and lowering of the arms and a vehicle wheel assembly in place thereon for wheel assembly removal and attachment to an axle mounted hub. Multiple rollers in each arm rotatably support the wheel assembly. The arms are collapsible toward one another and the handle repositionable between the arms for compact stowage of the apparatus in a vehicle.

5 Claims, 1 Drawing Sheet

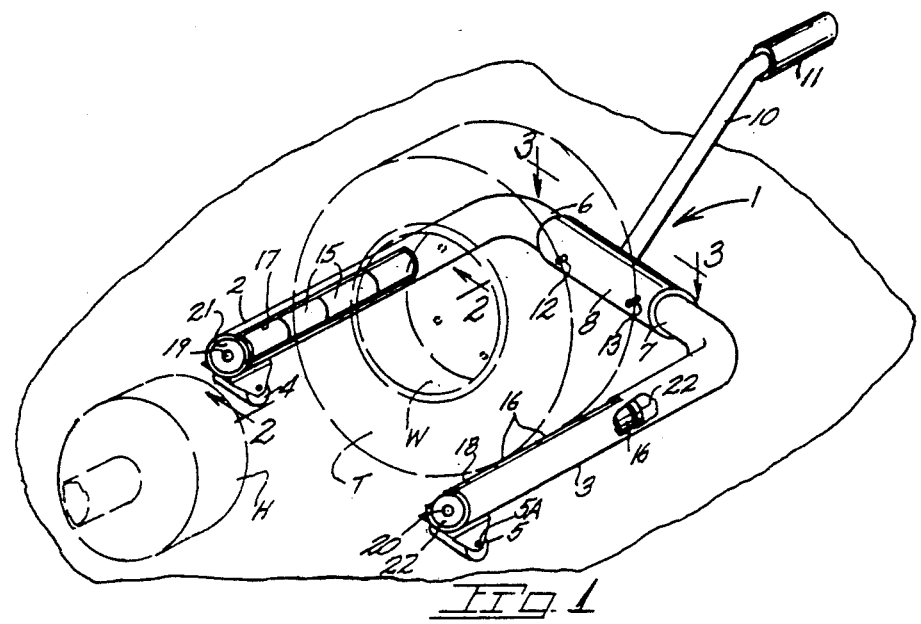
Fig. 1
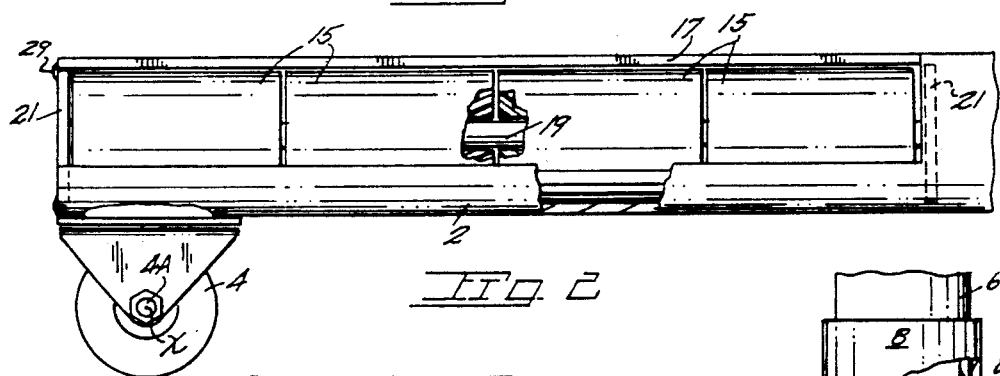
Fig. 2
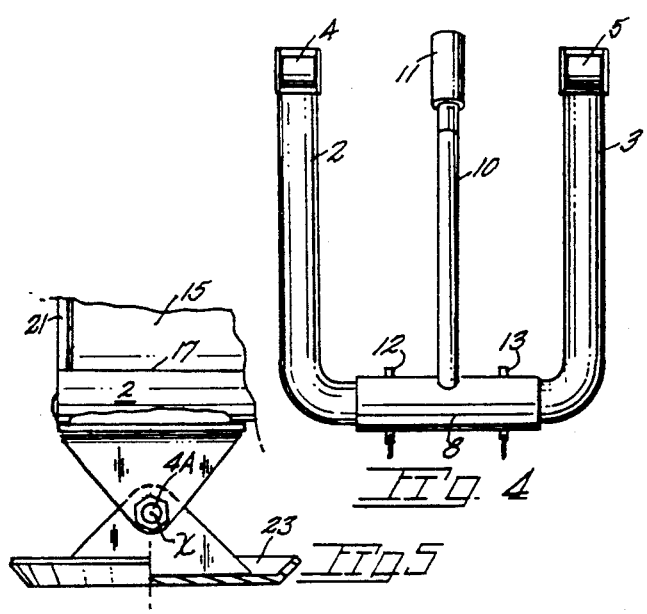
Fig. 4
Fig. 5
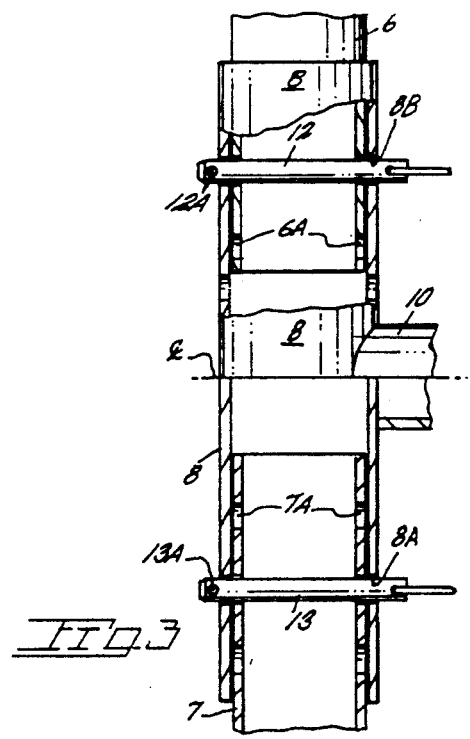
Fig. 3

VEHICLE WHEEL CHANGING TOOL

BACKGROUND OF THE INVENTION

The present invention pertains generally to a tool or apparatus for supporting and positioning a vehicle wheel assembly during wheel removal and installation on the axle mounted hub of a vehicle.

In the removal and installation of a wheel assembly, the assembly must be momentarily elevated for alignment of the wheel lug openings with the threaded lugs on the axle mounted hub. Tools and apparatus are disclosed in prior U.S. patents which are directed toward accomplishing this objective as for example the tools disclosed in U.S. Pat. Nos. 2,207,443; 1,920,350 and 4,771,531 to mention a few. The tool disclosed in U.S. Pat. No. 1,920,350 is of interest in that it discloses tubular rollers one each in place about a frame arm for rotatably supporting a wheel being changed. The tool is somewhat collapsible for storage purposes. U.S. Pat. No. 4,771,531 is of interest in that it shows a wheel changing tool with wheel supported arms. The known tools are not intended for use by the typical owner of a large vehicle or motor home where tire size prevents manually lifting and positioning of the tire into place on the axle mounted hub. Further, the known wheel changing tools are not readily stowable in a car or motor home.

SUMMARY OF THE INVENTION

The present invention is embodied in a wheel assembly carrier for emergency or shop use in the mounting and removing of a wheel assembly from a vehicle hub where assembly positioning is along and about multiple axes.

The present tool includes a pair of wheel supported arms each equipped with a multitude of rollers to facilitate rotational positioning of the wheel assembly to receive the hub carried studs or lug bolts without damaging same. Accordingly, regardless of wheel size the user can rotate same for alignment purposes with one hand. The tool arms are adjustable as well as repositionable to a compact configuration for storage aboard a vehicle. The sets of rollers in each arm are carried by axles with the roller peripheries exposed by arm cutouts which additionally reduces tool weight.

Important objectives include the provision of a highly portable wheel changing tool directed toward a wide range of uses including use by tire shops as well as individuals in the changing of a vehicle wheel along a roadway; the provision of a wheel changing tool which permits the changing of a motor home wheel of a size prohibiting changing without the aid of a tire changing tool; the provision of a wheel changing tool of lightweight construction and collapsible for compact stowage of the tool aboard a vehicle; the provision of a wheel changing tool adjustable to accomodate a range of wheel sizes.

BRIEF DESCRIPTION OF THE DRAWINGS

In the accompanying drawings:

FIG. 1 is a perspective view of the present wheel changing tool in use;

FIG. 2 is a fragmentary elevational view taken along line 2—2 of FIG. 1;

FIG. 3 is a fragmentary plan view taken along line 3—3 of FIG. 1;

FIG. 4 is a plan view of the tool reconfigured for storage within a vehicle; and FIG. 5 is a fragmentary elevational view of an arm member with a skid.

DETAILED DESCRIPTION OF THE PREFERRED EMBODIMENTS

With continuing attention to the drawings, the reference numeral 1 indicates the present tool in use for the changing of a wheel assembly including a tire T and wheel W.

The present tool includes arm members at 2 and 3 supported at their outer ends by caster wheels 4 and 5. The arms have inwardly turned aligned end segments at 6 and 7 which are received within connector means 8 shown as a tubular housing.

A handle 10 is suitably secured to housing 8 as by welding and is preferably somewhat angulated and provided with a hand grip 11 to facilitate convenient lifting and lowering of arms 2 and 3 about the axes of caster wheels 4 and 5 during wheel assembly installation and removal operations. For purposes of configuring the tool into a stowable configuration, the handle 10 and housing 8 are detachable from arm end segments 6 and 7 by means of pins 12 and 13 which may be of the quick release self-locking type as for example including a spring biased ball 12A-13A which prevents all but intentional pin extraction from the housing.

The arm members are provided with sets or series of rollers 15 and 16 which support the wheel assembly being removed or installed in a manner permitting convenient wheel rotation for alignment of the wheel openings with the lugs on a hub H. Cut out areas 17 and 18 of the arm members are each elongate in the axial direction of each member and provide arcuate exposure of the roller peripheries for contact with the tire tread. Additionally, the cut out portions of the arm members contribute towards portability of the present tool by effecting a weight reduction. The sets of rollers are each journalled on an axle at 19 and 20 which carry pairs of mounting plates 21 and 22 at their opposite ends for welded attachment in the arm members. Suitable roller construction is of a synthetic plastic such as nylon. The roller sets 15 and 16 along with axles 19 and 20 and the mounting plates carried thereby may be axially inserted into each of the arm members and the plates 21-22 tacked by welds 29 to facilitate ease of assembly of the tool. The low degree of friction between the rollers and their supporting axles greatly facilitates wheel assembly rotation to the extent the same may be readily accomplished by one hand of the user with the remaining hand grip 11 during wheel installation and removal operations.

To accomodate wheel assemblies of various sizes the arm members may be adjusted laterally by reason of the tubular connector housing 8 being equipped with the quick release pins which pass through pairs of openings 6A-7A in the arm end segments 6 and 7. Such arm openings and pin arrangement permit handle 10 to be swung substantially into a plane containing the arm members for purposes of providing compact tool configuration for storage purposes. Additionally, for such purposes the arm members 2 and 3 will be repositioned toward one another and secured in place within tubular housing 8 by the locking pins which pass through openings 8A and 8B in the housing in register with pairs of apertures 6A-7A.

In use, the present tool is adjusted by positioning of the arm members toward or away from one another to properly engage the tire tread. In the removal of a wheel assembly from a vehicle hub the tire will be elevated in the normal manner by a jack or lift to a raised position permitting insertion of the arm members and rollers below the tire. Subsequently, the wheel assembly is raised slightly to facilitate wheel assembly removal from the vehicle hub without damage to the lug bolt threads. Conversely, installation of the wheel assembly on the elevated hub of a vehicle axle is accomplished by lifting of the wheel assembly about the axes of the caster wheels. For alignment of the openings in the wheel with the lug bolts of the hub the user may readily rotate the wheel in place on the rollers whereafter the wheel assembly is engaged with the lug bolts in a manner avoiding damage to lug bolt threads. The leverage provided by the present tool permits emergency removal and installation of large wheel assemblies.

If so desired, the caster wheels 4 and 5 may be removed upon removal of axles 4A–5A and skids as at 23 substituted therefore on the axles to render the present tool more suitable for changing a wheel assembly on other than a paved shoulder of a roadway. In such a substitution the skids are swingably mounted on the wheel axles at 4A and 5A to permit lifting and lowering of the tool about the axes X of the axles 4A and 5A.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. A wheel changing apparatus for positioning a wheel assembly during removal from and installation on a vehicle hub and comprising, arm members of tubular construction including aligned end segments, wheels at distal ends of said arm members supporting the apparatus, means mounting each of said wheels to said arm members, said arm members each including internal rollers for supporting the wheel assembly being installed in a rotatable manner, axles supporting said rollers, said axles mounted one each in said arm members, axle mounting plates secured in the arm members, tubular connector means and adjustably receiving both of said end segments, and a handle on said connector means facilitating raising and lowering of said arm members about said wheels and the positioning a wheel assembly thereon in relation to the vehicle hub.

2. The apparatus claimed in claim 1 wherein said arm members each define an elongate cut out area to expose an arcuate portion of the rollers therein for supporting the wheel assembly.

3. The apparatus claimed in claim 1 wherein said tubular connector means includes a tubular housing, said end segments and said housing having registerable apertures, locking pins each detachably engageable with said housing and with said end segments of said arm members relative one another and to said tubular housing to accommodate a range of wheel assembly sizes.

4. The apparatus claimed in claim 3 wherein said housing is rotatably mounted on said end segments whereby upon detachment of said locking pins from said housing and from the arm end segments said housing and said handle thereon may be rotated about the arm end segments to locate the handle intermediate said arm members for compact storage of the apparatus in a vehicle.

5. The wheel changing apparatus claimed in claim 1 wherein said means mounting each of said wheels includes removable axles to permit the removal of said wheels and skids for mounting on said axles upon removal of said wheels.

* * * * *